United States Patent
Wang et al.

(10) Patent No.: US 12,467,415 B2
(45) Date of Patent: Nov. 11, 2025

(54) AIR HANDLING SYSTEMS AND CONTROLS FOR INTERNAL COMBUSTION ENGINES OPERATING WITH A MILLER CYCLE

(71) Applicant: Cummins Inc., Columbus, IN (US)

(72) Inventors: Ke Wang, Wuhan (CN); Kai Zou, Wuhan (CN); Chengxiu Huang, Hubei (CN); Timothy Shipp, Seymour, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/864,989

(22) PCT Filed: Jun. 29, 2022

(86) PCT No.: PCT/CN2022/102339
§ 371 (c)(1),
(2) Date: Nov. 12, 2024

(87) PCT Pub. No.: WO2024/000264
PCT Pub. Date: Jan. 4, 2024

(65) Prior Publication Data
US 2025/0314213 A1    Oct. 9, 2025

(51) Int. Cl.
| | | |
|---|---|---|
| *F02D 41/00* | (2006.01) | |
| *F02B 37/013* | (2006.01) | |
| *F02B 37/10* | (2006.01) | |
| *F02B 39/10* | (2006.01) | |

(52) U.S. Cl.
CPC ........ *F02D 41/0007* (2013.01); *F02B 37/013* (2013.01); *F02B 37/10* (2013.01); *F02B 39/10* (2013.01)

(58) Field of Classification Search
CPC ...... F02B 37/013; F02B 37/004; F02B 37/10; F02B 39/10; F02D 41/0007
See application file for complete search history.

(56) References Cited

U.S. PATENT DOCUMENTS

| | | |
|---|---|---|
| 2,670,595 A | 3/1954 | Miller |
| 8,096,123 B2 | 1/2012 | Liu et al. |
| 2008/0121218 A1 | 5/2008 | Algrain |
| 2011/0022289 A1 | 1/2011 | Hofbauer |
| 2013/0298552 A1 | 11/2013 | Branyon et al. |

(Continued)

FOREIGN PATENT DOCUMENTS

CN    209293909 U    8/2019

OTHER PUBLICATIONS

International Search Report and Written Opinion for International patent application No. PCT/CN22/102339, filed Jun. 22, 2022, mailed Jan. 5, 2023, 13 pgs.

*Primary Examiner* — Ngoc T Nguyen
(74) *Attorney, Agent, or Firm* — Taft Stettinius & Hollister LLP (57) ABSTRACT

A system includes an internal combustion engine including a valve train comprising one or more intake valves operable in a Miller cycle and one or more exhaust valves. An electric turbo motor is electronically controllable to boost an output from a lower pressure turbocharger to a higher pressure turbocharger. An electronic control system configured to control the electric turbo motor in response to a transient condition to boost intake flow pressure to the internal combustion engine during the transient condition.

20 Claims, 5 Drawing Sheets

(56) References Cited

U.S. PATENT DOCUMENTS

2014/0230430 A1\* 8/2014 Krug .................. F02B 29/0412
  60/273
2017/0058840 A1\* 3/2017 Wu .......................... F01N 5/04
2018/0119625 A1 5/2018 Dane
2021/0062711 A1 3/2021 Fritz et al.

\* cited by examiner

AIR HANDLING SYSTEMS AND CONTROLS FOR INTERNAL COMBUSTION ENGINES OPERATING WITH A MILLER CYCLE

TECHNICAL FIELD

The present application relates generally to engine air handling systems and controls, and more particularly, but not exclusively, to air handling systems and controls for internal combustion engines that operate with a Miller cycle.

BACKGROUND

Engines may utilize different combustion cycles which are suited for different operational states. For example, turbocharging and/or Miller cycles can be employed on one or more cylinders of engines to improve fuel efficiency, thermal management, and engine power at steady state. A number of proposals have been made for controlling such engines and systems. Existing approaches suffer from a number of disadvantages, shortcomings, and unmet needs including those respecting transient operation and emissions. There remains a significant need for the unique apparatuses, methods, systems, and techniques disclosed herein.

DISCLOSURE OF EXAMPLE EMBODIMENTS

For the purposes of clearly, concisely, and exactly describing example embodiments of the present disclosure, the manner, and process of making and using the same, and to enable the practice, making and use of the same, reference will now be made to certain example embodiments, including those illustrated in the figures, and specific language will be used to describe the same. It shall nevertheless be understood that no limitation of the scope of the invention is thereby created, and that the invention includes and protects such alterations, modifications, and further applications of the example embodiments as would occur to one skilled in the art.

SUMMARY OF THE DISCLOSURE

A number of embodiments relating to air handling controls for internal combustion engines that operate with Miller cycles are disclosed. As used herein, a Miller cycle includes engine cycles in which an over-expanded cycle is employed. In over-expanded cycles, the effective compression ratio is smaller than the effective expansion ratio, and are implemented with either early (EIVC) or late (LIVC) intake valve closing relative to bottom-dead-center of the intake stroke. The primary effect of EIVC and LIVC is a reduction in temperature at the end of the compression stroke. The lower temperature enables the use of higher geometric compression ratios that yield a longer expansion ratio and an efficiency benefit.

One embodiment of the present disclosure is a unique apparatus providing air handling and/or air handling controls for internal combustion engines that operate with Miller cycles. Another embodiment is a unique system providing air handling and/or air handling controls for internal combustion engines that operate with Miller cycles. A further embodiment is a unique method of controlling air handling systems of internal combustion engines that operate with Miller cycles. Further embodiments, forms, objects, features, advantages, aspects, and benefits shall become apparent from the following description and drawings.

DESCRIPTION OF THE ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 1:
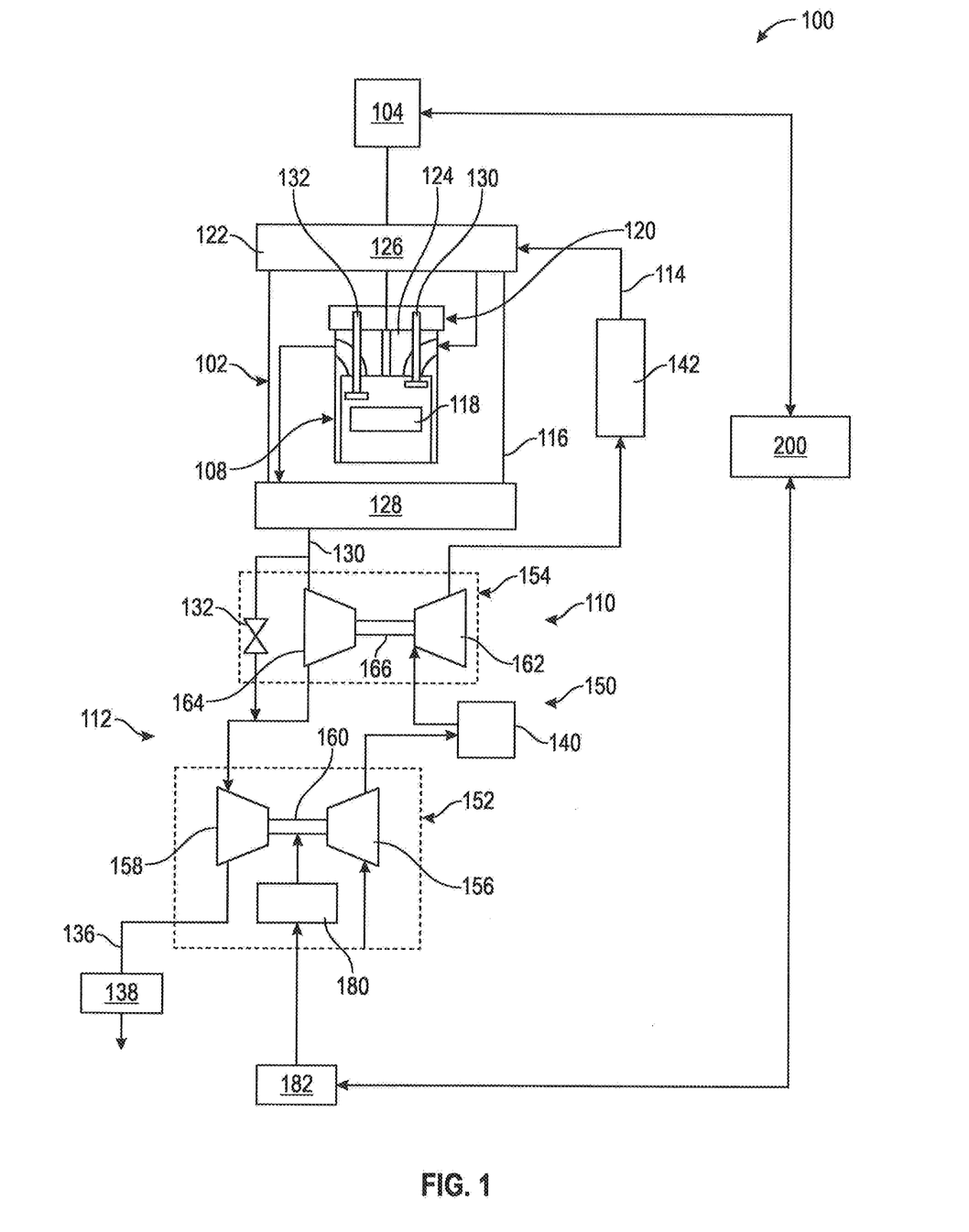
FIG. 1 is a schematic block diagram of an internal combustion engine system with an internal combustion engine that includes one or more cylinders that operate with a Miller cycle and a multi-stage turbocharger system.

With reference to FIG. 1, an internal combustion engine system 100 includes an internal combustion engine 102 and a multi-stage turbocharger system 150 illustrated in schematic form. Internal combustion engine system 100 includes a fuel source 104 that is operable with internal combustion engine 102 to provide fueling to one or more cylinders 108 of engine 102. Any type of fueling is contemplated for system 100, including diesel fuel, gasoline, gaseous fuel, hydrogen fuel, and dual fuel arrangements. In addition, one or more electric turbo motors 180 may be provided to output power to propel a vehicle that is propelled with engine 102 and/or to assist in powering one or more other components of system 100, such as with a hybrid vehicle.

Engine 102 is connected with an intake system 110 for providing an intake flow to engine 102 and an exhaust system 112 for output of exhaust gases in an exhaust flow. In the illustrated embodiment, the engine 102 only shown with a single cylinder 108, but any number and arrangement of cylinders 108 is contemplated, and system 100 is not limited to the number and arrangement shown in FIG. 1.

Engine 102 includes an engine block 116 that at least partially defines the cylinder(s) 108. A piston 118 may be slidably disposed within each cylinder 108 to reciprocate between a top-dead-center position and a bottom-dead-center position while rotating a crank shaft (not shown). Each of the cylinders 108, its respective piston 118, and the cylinder head 122 form a combustion chamber 124. Each cylinder 108 may also receive fuel from a fuel injector coupled to fuel source 104 and, if spark ignited, a spark plug for controlling the timing and initiation of the combustion process. Each cylinder 108 includes one or more intake valves 130 and one or more exhaust valves 132 that are part of a valve train 120.

Valve train 120 may also include a cam shaft (not shown) and other components to control the opening and closing of intake valves 130 and exhaust valves 132. The valve train 120 may be implemented in a number of other forms including a number of additional components such as rockers, lash adjusters, bearing surfaces, gears, separate camshafts for intake cam lobes and exhaust cam lobes, and other components as will occur to one of skill in the art with the benefit and insight of the present disclosure. The valve train 120 can be configured to time the opening and closing of the intake valves 130 and the exhaust valves 132 relative to the positioning of piston 118 between top-dead-center and bottom-dead-center positions to control the entrance of the intake flow and exit of exhaust flow. In an embodiment, the valve train 120 opens intake valves 130 to provide EIVC or LIVC relative to bottom-dead-center of the intake stroke of piston 118 so that the cylinder(s) 108 operate with a Miller cycle.

In one embodiment, engine 102 is a four stroke engine. That is, for each complete engine combustion cycle (i.e., for every two full crank shaft rotations), each piston 118 of each cylinder 108 moves through an intake stroke, a compression stroke, a combustion or power stroke, and an exhaust stroke. Thus, during each complete combustion cycle for each cylinder 108, intake flow is drawn into individual combustion chambers 124 from an intake manifold 126 and exhaust gas is supplied to an exhaust manifold 128.

The engine 102 includes cylinder(s) 108 connected to the intake system 110 to receive the intake flow. Cylinder(s) 108 are connected to exhaust system 112 to release exhaust gases produced by combustion of the fuel(s) in combustion chambers 124. Exhaust system 112 provides exhaust flow to multi-stage turbocharger system 150. Turbocharger system 150 includes multiple turbochargers to provide higher pressure and lower pressure turbocharging stages that compress the intake flow using energy from the exhaust flow. Furthermore, exhaust system 112 can be connected to intake system 110 with one or both of a high pressure exhaust gas recirculation (EGR) system and a low pressure EGR system (not shown.)

Intake system 110 includes one or more inlet supply conduits 114 extending from turbocharger system 150 and connected to intake manifold 126, which distributes the charge flow to cylinder(s) 108 of engine 102. Exhaust system 112 is also coupled to engine 102 with engine exhaust manifold 128. Exhaust system 112 includes an exhaust conduit 130 extending from exhaust manifold 128 to turbocharger system 150. In one embodiment, exhaust conduit 130 is flow coupled to exhaust manifold 128, and may also include one or more intermediate flow passages, conduits or other structures. A controllable wastegate 132 or other suitable bypass in exhaust conduit 130 is operable to selectively bypass at least a portion of the exhaust flow from one or more turbines of turbocharger system 150 to reduce boost pressure and engine torque under certain operating conditions.

An aftertreatment system 138 can be connected with an outlet conduit 136. The aftertreatment system 138 may include, for example, three way catalysts (TWC), oxidation devices (DOC), particulate removing devices (DPF, CDPF), constituent absorbers or reducers (SCR, AMOX, LNT), reductant systems, and other components if desired.

Turbocharger system 150 includes a lower pressure, first stage turbocharger 152 and a higher pressure, second stage turbocharger 154. More than two stages are contemplated in other turbocharger embodiments. First stage turbocharger 152 includes a first compressor 156 in the intake system 110 and a first turbine 158 in the exhaust system 112. The first turbine 158 is connected to first compressor 156 with a shaft 160 and is operable to drive first compressor 156 with the exhaust flow. The first compressor 156 receives the intake flow in a non-compressed state and outputs a compressed intake flow to second stage turbocharger 154.

In addition, an electric turbo motor 180 can be selectively engaged to shaft 160 of first stage turbocharger 152 in order to boost the pressure of the compressed intake flow output from first compressor 156. As discussed further below, electric turbo motor 180 can be selectively engaged to shaft 160 with a connection 168 (FIG. 2), such as a clutch or any other suitable selectively engageable connection, in response to a transient condition for internal combustion engine 102 to increase or boost the compression of the intake flow from first compressor 156 to improve engine performance during Miller cycle operations, such as by improving combustion and reducing smoke. Electric turbo motor 180 can be powered from an electrical system 182 of the internal combustion engine system 100. In an embodiment, the electrical system 182 is a 48 V/24 V DC electrical system.

Second stage turbocharger 154 includes a second compressor 162 in the intake system 110 and a second turbine 164 in the exhaust system 112. The second turbine 164 is connected to second compressor 162 with a shaft 166 and is operable to drive second compressor 162 with the exhaust flow received from exhaust manifold 128. The second compressor 162 receives the intake flow in a compressed state from first compressor 156 and outputs a further compressed intake flow to intake manifold 126.

Turbochargers 152, 154 may be any suitable turbocharger known in the art, including variable geometry turbine turbochargers and/or wastegated turbochargers. For example, wastegate 132 provides a controllable bypass around second turbine 164. One or more of first compressor 156 and second compressor 162 may also include a bypass.

Intake system 110 may also include an intercooler 140 between first compressor 156 and second compressor 162. Intake system 110 may also include an aftercooler 142 downstream of second compressor 162 and upstream of intake manifold 126. Intercooler 140 and/or aftercooler 142 may be, for example, an air-to-air heat exchanger, an air-to-liquid heat exchanger, or a combination of both to facilitate the transfer of thermal energy to or from the flow directed to engine 102. Intake system 110 may also include an intake throttle (not shown).

In operation of internal combustion engine system 100, fresh air is supplied to first compressor 156. The fresh air flow or combined flows can be filtered, unfiltered, and/or conditioned in any known manner, either before or after mixing with EGR flow when provided. The intake flow is pressurized with first compressor 156 and sent through intercooler 140 to second compressor 162. First compressor 156 can be boosted by electric turbo motor 180 during a transient condition. The pressurized intake flow is further pressurized with second compressor 162 and flows through aftercooler 142 to intake manifold 126.

In any embodiment, the fueling provided to cylinder(s) 108 from the fuel source 104 is controlled by an electronic control system (ECS) 200 to control the flow of fuel in accordance with engine speed, engine loads, intake manifold pressure and temperature, and fuel pressures, for example. Electric turbo motor 180 responds to control commands from ECS 200 to selectively start and stop electric turbo motor 180 to drive first compressor 156 via shaft 160 and to provide a compression boost to the intake flow to engine 102.

Figure 2:
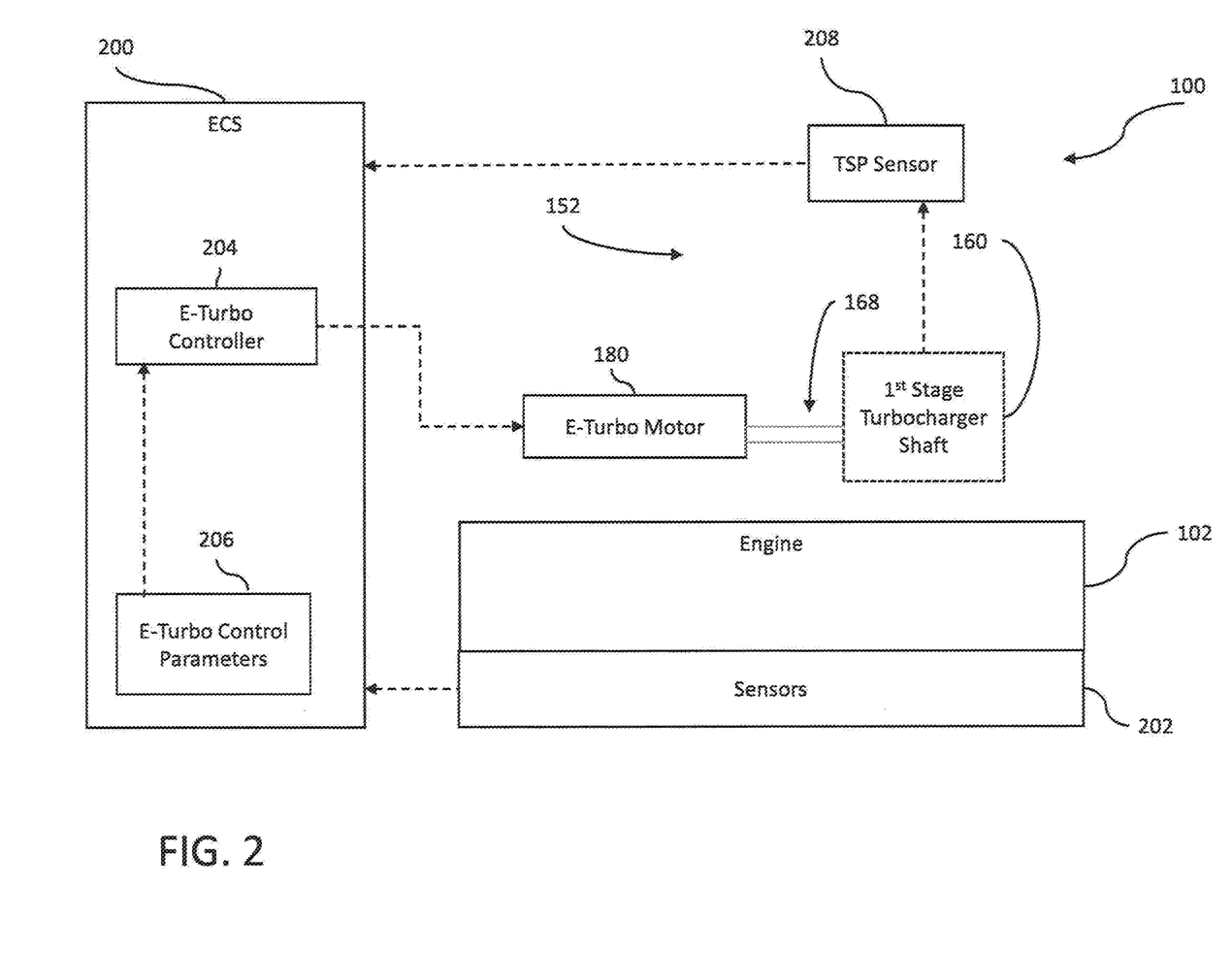
FIG. 2 is a schematic block diagram of an electronic control system and the internal combustion engine of FIG. 1.

Referring further to FIG. 2, engine 102 includes one or more engine sensors 202 operably connected to ECS 200 to provide signals indicative of one or more of the engine operating parameters. ECS 200 preferably includes one or more programmable microprocessors or microcontrollers of a solid-state, integrated circuit type, and one or more non-transitory memory media configured to store instructions executable by the one or more microprocessors or microcontrollers.

ECS 200 is configured to implement an electronic turbo motor (E-turbo) controller 204 which is configured to provide and output control commands to control operation of the electric turbo motor 180. E-turbo controller 204 can be configured to output commands to selectively engage and disengage the connection 168 between electric turbo motor 180 and shaft 160 in response to transient conditions of engine 102. The turbine speed (TSP) sensor 208 may receive information from first stage turbocharger 152 regarding a speed of shaft 160. It shall be appreciated that FIG. 2 depicts control relationships between the foregoing components conceptually using dashed arrows and that various communications hardware and protocols may be utilized to implement, such as one or more controller area networks (CAN) or other communications components.

Sensors 202 main include one or more instances of the following sensors and associated input parameters. An engine speed sensor may be configured to provide an input parameter indicative of an engine speed. An Oxygen or lambda sensor may be configured to provide an input parameter indicative of an amount of concentration of oxygen of an intake charge and/or an air-fuel ratio of the intake charge. An injector rail pressure sensor may be configured to provide an input parameter indicative of a fuel pressure of a fuel injector rail. An intake charge pressure sensor may be configured to provide an input parameter indicative of the pressure of the intake flow or charge. An intake charge temperature sensor may be configured to provide an input parameter indicative of the temperature of the intake flow or charge. A number of additional and/or alternative sensors and associated input parameters may be provided in the sensors 202 as will occur to one of skill in the art with the benefit and insight of the present disclosure.

Electronic turbo control parameters 206 may include one or more instances of a number of engine operating parameters indicative of a transient event. Examples include engine speed, accelerator pedal position, output torque of engine 102, start of injection timing, a total amount of fuel in all injections, an amount of fuel in a first pilot injection, a timing of the first pilot injection, an amount of fuel in a second pilot injection, a timing of the second pilot injection, a timing of a main injection, an amount of fuel in a first post injection, a timing of the first post injection, an amount of fuel in a second post injection, a timing of the first post injection, and an amount of fuel in the main injection event. Such electronic turbo control parameters may be determined and provided by other controllers and control components of ECS 200.

The ECS 200 can be implemented in any of a number of ways that combine or distribute the control function across one or more control units in various manners. The ECS 200 may execute operating logic that defines various control, management, and/or regulation functions. This operating logic may be in the form of dedicated hardware, such as a hardwired state machine, analog calculating machine, programming instructions, and/or a different form as would occur to those skilled in the art. The ECS 200 may be provided as a single component or a collection of operatively coupled components; and may be comprised of digital circuitry, analog circuitry, or a hybrid combination of both of these types. When of a multi-component form, the ECS 200 may have one or more components remotely located relative to the others in a distributed arrangement. The ECS 200 can include multiple processing units arranged to operate independently, in a pipeline processing arrangement, in a parallel processing arrangement, or the like. It shall be further appreciated that the ECS 200 and/or any of its constituent components may include one or more signal conditioners, modulators, demodulators, Arithmetic Logic Units (ALUs), Central Processing Units (CPUs), limiters, oscillators, control clocks, amplifiers, signal conditioners, filters, format converters, communication ports, clamps, delay devices, memory devices, Analog to Digital (A/D) converters, Digital to Analog (D/A) converters, and/or different circuitry or components as would occur to those skilled in the art to perform the desired communications.

Figure 3:
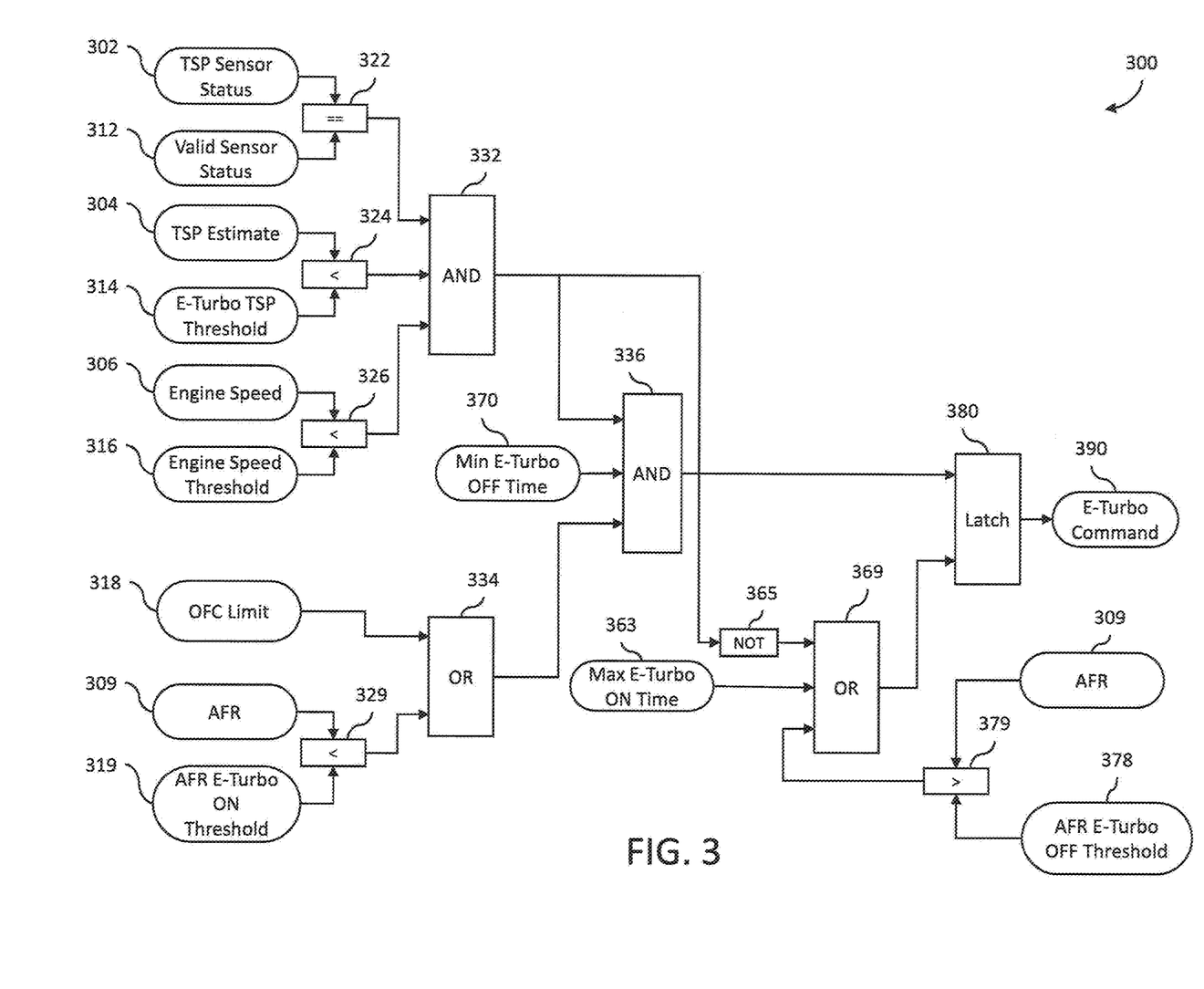
FIG. 3 is a logic diagram illustrating example turbocharger system control logic for the multi-stage turbocharger system and internal combustion engine of FIG. 1.
Figure 4:
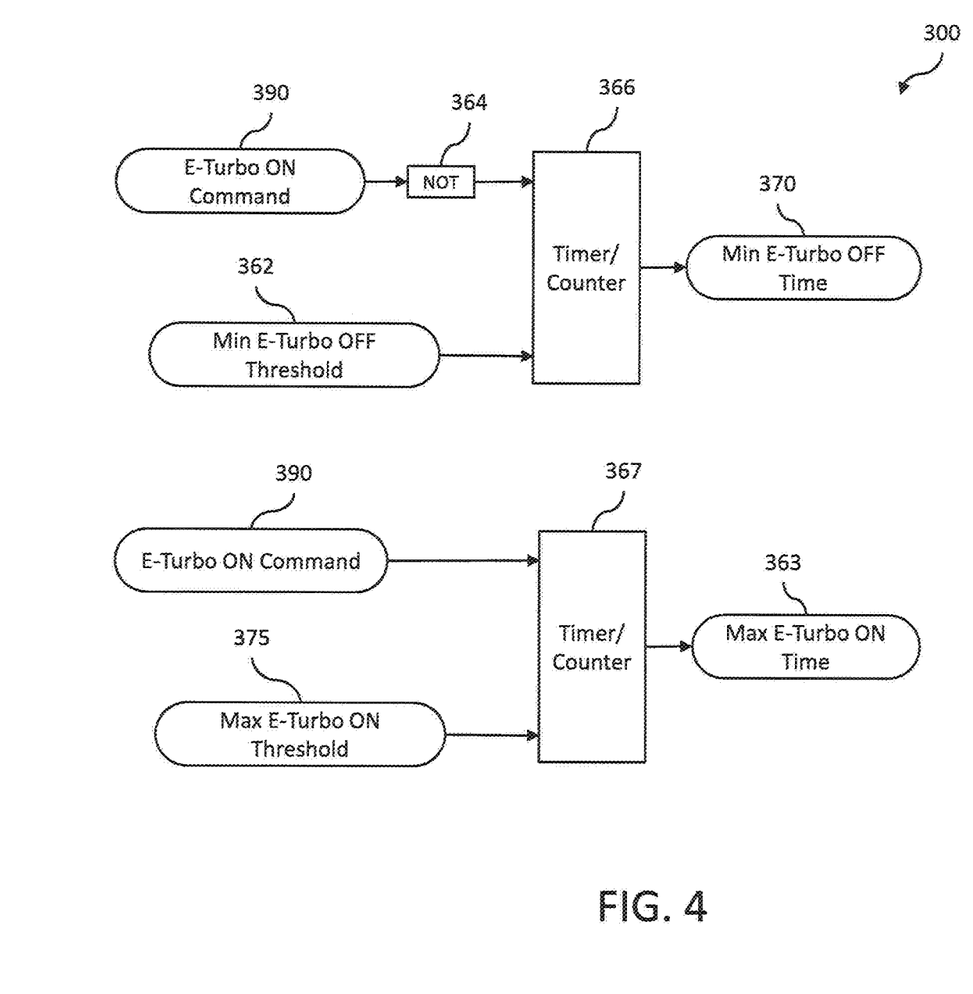
FIG. 4 is a logic diagram illustrating a further example of turbocharger system control logic.

With reference to FIGS. 3-4, there are illustrated example E-turbo controls 300 (also referred to herein as controls 300) which may be implemented in and executed by ECS 200, E-Turbo controller 204, or another electronic control system. For example, controls 300 may be implemented and executed in whole or in part by E-turbo controller 204 alone or in combination with other electronic control system components. Controls 300 are configured to determine and provide an E-turbo command 390 which is configured and effective to control operation of an electric turbo motor 180 in response to transient conditions to selectively provide boosted intake flow pressure during Miller cycle operation of an engine system such as engine system 100. When applied to engine system 100 and ECS 200, controls 300 may selectively provide boosted intake flow pressure in response to a transient operating condition of engine 102.

TSP sensor status 302 and valid sensor status 312 are provided as inputs to operator 322 which evaluates whether the TSP sensor status 302 is equal to the valid sensor status 312 and provides the result of this evaluation to operator 332. TSP sensor status 302 provides an indication of the operational state of a turbine speed sensor such as TSP sensor 208. Valid sensor status 312 provides an indication of a valid operational state of the TSP sensor 208. Thus, the evaluation performed by operator 322 provides an indication of whether the TSP sensor is operating correctly based on one or more criteria such as an on flag, diagnostic, rationality evaluation, output range evaluation or other evaluations, diagnostics, and flags as will occur to one of skill in the art with the benefit and insight of the present disclosure.

TSP estimate 304 and TSP threshold 314 are provided as inputs to operator 324 which evaluates whether the TSP estimate 304 is less than the TSP threshold 314 and provides the result of this evaluation to operator 332. TSP estimate 304 indicates a turbine speed value provided by a TSP sensor 208. TSP threshold 314 indicates a maximum threshold or limit on turbine speed above which engagement of electric turbo motor 180 to shaft 160 of first stage turbocharger 152 is not permitted. TSP threshold 314 may be configured based on a reliability or safety requirement of a given turbocharger design. In some forms, TSP threshold 314 may be calibratible based on requirements of a selected engine design or requirements of a selected engine mission.

Engine speed 306 and engine speed threshold 316 are provided as inputs to operator 326 which evaluates whether the engine speed 306 is less than the engine speed threshold 316 and provides the result of this evaluation to operator 332. Engine speed 306 indicates an engine speed value provided by an engine speed sensor. Engine speed threshold 316 indicates a maximum threshold or limit on engine speed above which engagement of electric turbo motor 180 to shaft 160 of first stage turbocharger 152 is not permitted. Engine speed threshold 316 may be configured based on a reliability or safety requirement of a given engine and/or turbocharger design. In some forms, engine speed threshold 316 may be calibratible based on requirements of a selected engine design or requirements of a selected engine mission.

Operator 332 performs a logical AND operation on the inputs that it receives from operator 322, operator 324, and operator 326 and provides the result of the logical AND operation to operator 336 and to logical NOT operator 365. Thus, when the outputs of operator 322, operator 324, and operator 326 are all true, the output of operator 332 is also true, and when any of the outputs of operator 322, operator 324, and operator 326 is false, the output of operator 332 is also false. It shall be appreciated that reference herein to logic states or values as "true" is synonymous with and includes affirmative, enabled, or high logic states or values, among other logic terms as will occur to one of skill in the art with the benefit of the present disclosure. Likewise, it shall be appreciated that reference herein to logic states or values as "false" is synonymous with and includes negative, disabled, or low logic states or values, among other logic terms as will occur to one of skill in the art with the benefit of the present disclosure.

AFR 309 and AFR E-Turbo ON threshold 319 are provided as inputs to operator 329 which evaluates whether the AFR 309 is less than the AFR E-Turbo ON threshold 319 and provides the result of this evaluation to operator 334. AFR 309 indicates an air-fuel ratio of the charge combusted by the engine system 100 provided by a sensor such as an oxygen or lambda sensor. The sensor may also be a virtual sensor, such as determining AFR from other parameters such as air flow divided by fuel mass. AFR E-Turbo ON threshold 319 indicates a maximum threshold or limit on the air-fuel ratio of the charge combusted by the engine system above which boosted compressed intake flow by electric turbo motor 180 of an engine system is not permitted. AFR E-Turbo ON threshold 319 may be configured and selected based on an emissions limit established relative to a given engine design or relative to an individual engine. For example, AFR E-Turbo ON threshold 219 may be configured and selected based on smoke or particulate emissions during engine transients of an engine operating in a Miller cycle such as an EIVC or LIVC Miller cycle. Thus, the evaluation performed by operator 329 provides an indication of whether the air-fuel ratio of the charge combusted by the engine system is of a magnitude such that boosted compressed intake air flow by electric turbo motor 180 is desired to achieve desired emissions performance, such as during a transient condition.

OFC limit 318 is provided as an input to operator 334. Operator 334 performs a logical OR operation on the inputs received from operator 329 and OFC limit 318 and provides the result of this operation to operator 336. OFC limit 318 provides an indication that the engine system is operating an oxygen-fuel control (OFC) mode. The OFC mode is determined based upon an evaluation that a ratio of oxygen to fuel in the charge combusted by the engine system has exceeded a minimum threshold or limit. The ratio of oxygen to fuel in the charge combusted by the engine is related to, but may vary from, the air-fuel ratio due to effects of EGR fraction, residual gases, and charge flow. One non-limiting example of an OFC limit determination is found in U.S. Pat. No. 6,508,241 issued Jan. 21, 2003, the disclosure of which is incorporated by reference.

OFC limit 318 may correspond to engine operating conditions in which a boosted intake air flow compression by electric turbo motor 180 is desired to mitigate smoke or particulate emissions that may arise during engine transients of an engine operating in a Miller cycle such as an EIVC or LIVC Miller cycle. Thus, OFC limit 318 provides an indication of whether the oxygen-fuel ratio of the charge combusted by the engine system is of a magnitude such that boosted compression of intake flow to the engine system is desired to achieve desired emissions performance.

As illustrated in FIG. 4, E-Turbo command 290 is provided as input to logical NOT operator which provides the logical inverse of the E-Turbo command as output to timer/counter 366. Timer/counter 366 may be configured and provided as a timer, a counter, a universal timer counter, or in other forms as will occur to one of skill in the art. Timer/counter 366 also receives minimum E-Turbo OFF threshold 362 as an input and compares the time or count number for which the value received from logical NOT operator 364 has been true against the minimum E-Turbo OFF threshold 362. When the minimum E-Turbo OFF threshold 362 has been met or exceeded, timer/counter 366 sets the value of minimum E-Turbo off time 370 to true and provides the same as input to operator 336. A true value of minimum E-Turbo off time 370 indicates that electric turbo motor 180 has been off or inactive for a minimum time or count required to allow activation of the electric turbo motor 180 to provide boosted compressed intake flow operation and a false value indicates the contrary.

Operator 336 performs a logical AND operation on the inputs it receives from operator 332, operator 334, and minimum E-Turbo off time 370 and provides the result of this operation to latch 380 which, in turn, sets the value of E-Turbo command 390. Thus, when the inputs received from operator 332, operator 334, and minimum E-Turbo off time 370 are all true, the value of E-Turbo command 390 is set to true.

AFR 309 and AFR E-Turbo OFF threshold 378 are provided as inputs to operator 379 which evaluates whether the AFR 309 is greater than the AFR E-Turbo OFF threshold 378 and provides the result of this evaluation to operator logical OR operator 369. AFR 309 indicates an air-fuel ratio of the charge combusted by the engine system provided by a sensor such as an oxygen or lambda sensor. AFR E-Turbo OFF threshold 378 indicates a threshold or limit on the air-fuel ratio of the charge combusted by the engine system above which boosted intake air flow compression of an engine system is not permitted. AFR E-Turbo OFF threshold 378 may be configured and selected to avoid excessive charge or intake flow which worsen fuel economy and reduce or limit the E-Turbo on time to enhance reliability. Thus, the evaluation performed by operator 379 provides an indication of whether the air-fuel ratio of the charge combusted by the engine system is of a magnitude such that non-boosted intake flow of the engine system from electric turbo motor 180 is desired to achieve desired fuel economy and to reduce or limit E-Turbo on time to enhance reliability.

As illustrated in FIG. 4, E-Turbo command 390 is provided as input to timer/counter 367. Timer/counter 367 may be configured and provided as a timer, a counter, a universal timer counter, or in other forms as will occur to one of skill in the art. Timer/counter 367 also receives maximum E-Turbo ON threshold 375 as an input and compares the time or count number for which the value of the input received from E-Turbo command 390 has been true against the maximum E-Turbo threshold 375. When the maximum E-Turbo ON threshold 375 has been met or exceeded, timer/counter 367 sets the value of maximum E-Turbo on time 363 to true and provides the same as input to logical OR operator 369. A true value of maximum E-Turbo on time 363 indicates that E-Turbo has been on or activated for a maximum permitted time or count beyond which activation of electric turbo motor 180 is not permitted and a false value indicates the contrary.

As indicated above, the output of logical NOT operator 365, the output of operator 329, and the maximum E-Turbo ON time 363 are provided as inputs to logical OR operator 369. Logical OR operator 369 performs a logical OR operation on the inputs received from logical NOT operator 365, operator 329, and the maximum E-Turbo ON time 363 and provides the result of this operation to latch 380 which, in turn, sets the value of E-Turbo command 390. Thus, when a value of any of the inputs received from logical NOT operator 365, operator 329, and the maximum E-Turbo ON time 363 is true, the value of E-Turbo command 390 is set to false.

Figure 5:
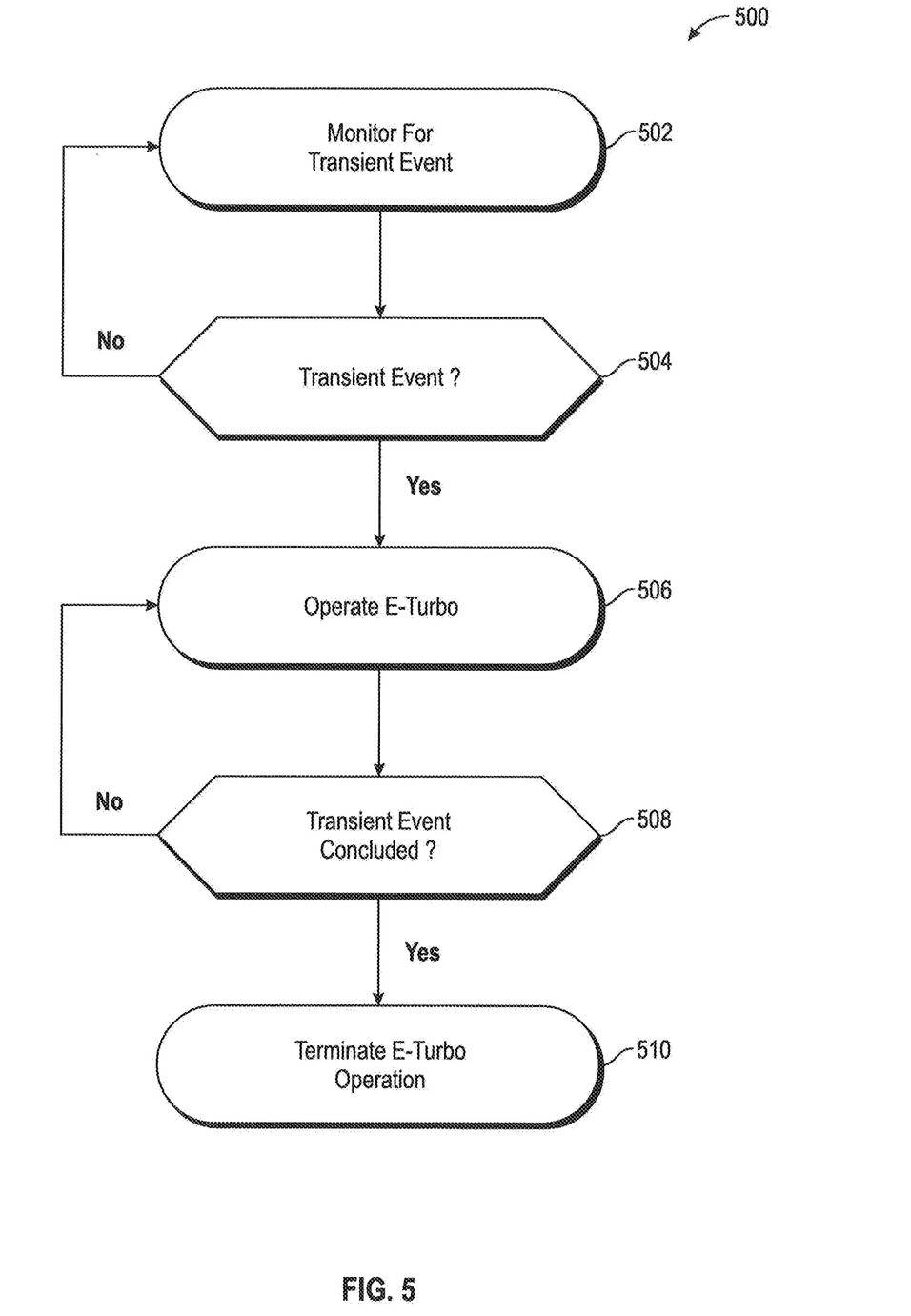
FIG. 5 is a schematic flow diagram of a procedure for controlling operation of the multi-stage turbocharger system in conjunction with the internal combustion engine of FIG. 1.

Referring now to FIG. 5, there is shown a procedure 500 for operating the internal combustion engine system 100 described herein. Procedure 500 starts at operation 502 to monitor for operating conditions of engine 102 that are indicative of a transient event or condition. For example, one or more sensors 202 connected to ECS 200 are operable to provide operating signals indicating one or more operating parameters or conditions of engine 102 that indicate a transient event.

In other embodiments, operating conditions indicative a transient event can include, for example, depression of input device such as an accelerator, a threshold increase in load applied to internal combustion engine 102, a threshold increase in power demanded from internal combustion engine 102, and/or a threshold increase in torque in an output shaft connected to internal combustion engine 102. Accordingly, one or more sensors 202 connected to ECS 200 are operable to provide operating signals indicating one or more operating parameters or conditions of internal combustion engine 102 that indicate a transient event.

Procedure 500 continues from operation 502 at conditional 504 to determine whether there is a transient event present. If conditional 504 is negative, procedure 500 returns to continue the monitoring operations 502. If conditional 504 is positive, procedure 500 continues at operation 506 to initiate operation of electric turbo motor 180. In an embodiment, conditional 504 can further including executing control 300 in order to determine whether or not to operate electric turbo motor 180 in response to the transient event.

Procedure 500 continues from operation 506 to conditional 508 to determine if the transient event is concluded. If conditional 508 is negative, procedure 500 returns to operation 506. If conditional 508 is positive, procedure continues at operation 510 to terminate operation of the electric turbo motor 180.

With the systems and methods such as those shown in FIGS. 1-5, control strategies may be implemented to improve engine response and performance during transient events. The electric turbo motor 180 can be employed in response to transient events to provide boosted air to the cylinder(s) 108 for combustion and increased power. As a result, a target or desired engine output torque can be achieved more rapidly during operation of electric turbo motor 180 than without.

Various aspects of the present disclosure are contemplated. In one aspect of the present disclosure, an internal combustion engine system is provided. The system includes an internal combustion engine with an intake system and an exhaust system. The internal combustion engine also includes at least one cylinder for receiving an intake flow for combustion to produce an exhaust flow. The system also includes a turbocharger system including a lower pressure turbocharger and a higher pressure turbocharger in series with one another. The lower pressure turbocharger includes a first turbine and a first compressor that is driven by the exhaust flow through the first turbine to compress the intake flow, and the higher pressure turbocharger includes a second turbine upstream of the first turbine in the exhaust system. The higher pressure turbocharger includes a second compressor downstream of the first compressor in the intake system, and the second compressor is driven by the exhaust flow through the second turbine to further compress the compressed intake flow from the first compressor. The turbocharger system also includes an electric turbo motor connected to the first compressor that is operable to drive the first compressor to boost an output of the first turbine, and a controller configured to operate the electric turbo motor to drive the first compressor to provide a compression boost of the intake flow to the internal combustion engine in response to a transient event for the internal combustion engine.

In an embodiment, the electric turbo motor is connected to a shaft between the first compressor and the first turbine in response to the transient event in order to drive the first compressor during the transient event.

In an embodiment, the system includes an intercooler in the intake system between the first compressor and the second compressor. In a refinement of this embodiment, the system includes an aftercooler in the intake system downstream of the second compressor. In still a further refinement, a wastegate is provided around the second turbine.

In another embodiment, the internal combustion engine includes a valve train comprising one or more intake valves and one or more exhaust valves for the at least one cylinder. In a refinement of this embodiment, the one or more intake valves are operated in a Miller cycle.

In a further refinement of the above embodiments, the controller is configured to operate the electric turbo motor to drive the first compressor in response to the transient if: an engine speed condition is satisfied; a turbo speed condition is satisfied; at least one of an air-fuel ratio (AFR) condition and an oxygen-fuel-control (OFC) condition is satisfied; and a minimum off time condition for the electric turbo motor is satisfied.

In still a further refinement of the system one or more of the following is provided: the engine speed condition is satisfied if an engine speed does not exceed an engine speed threshold; the turbo speed condition is satisfied if an estimated turbo speed of the lower pressure turbocharger does not exceed a turbo speed threshold; the AFR condition is satisfied if an air-fuel-ratio of the internal combustion engine does not exceed an AFR threshold; the OFC condition is satisfied if the internal combustion engine is operating in an oxygen fuel control mode; and the minimum off time condition for the electric turbo motor is satisfied if the electric turbo motor has been off or deactivated for at least a predetermined time.

In a further refinement, the electronic control system is configured to terminate operation of the electric turbo motor if any of: the engine speed condition is not satisfied; the turbo speed condition is not satisfied; the AFR condition is not satisfied; and a maximum on time condition for the electric turbo motor is satisfied.

In still a further refinement, the maximum on time condition for the electric turbo motor is satisfied if the electric turbo motor has been on or activated for at least a predetermined time.

According to another aspect of the present disclosure, an apparatus for controlling operation of the internal combustion engine is provided. The internal combustion engine includes an intake system and an exhaust system, and at least one cylinder for receiving an intake flow from the intake system, for receiving fuel, and to produce an exhaust flow to the exhaust system. The engine further includes a valve train associated with the at least one cylinder including at least one intake valve for operation in a Miller cycle and at least one exhaust valve. The engine also includes a multi-stage turbocharger system driven by the exhaust flow. The multi-stage turbocharger system includes a first compressor in the intake system that is coupled to an electric turbo motor and that is coupled to a first turbine. The multi-stage turbocharger further includes a second compressor downstream of the first compressor and a second turbine upstream of the first turbine that is coupled to the second compressor. The apparatus for controlling the engine operation includes a controller operably connected to the internal combustion engine that is configured to determine a transient event associated with the internal combustion engine, and initiate operation of the electric turbo motor in response to the transient event to provide a compression boost of the intake flow by the first compressor.

In an embodiment, the controller is configured to receive inputs from one or more sensors that provide one or more parameters indicative of an engine speed of the internal combustion engine, a turbo speed associated with the first compressor and the first turbine, an AFR condition, and an OFC condition.

In a refinement of the above embodiment, the controller is configured to operate the electric turbo motor to drive the first compressor in response to the transient if: an engine speed condition is satisfied in response to the engine speed not exceeding an engine speed threshold; a turbo speed condition is satisfied in response to the turbo speed not exceeding a turbo speed threshold; an AFR condition does not exceed an AFR threshold or an OFC condition is operating in an oxygen fuel control mode; and a minimum off time condition for the electric turbo motor is satisfied by the electric turbo motor being off or deactivated for at least a predetermined time.

In still a further refinement of the above embodiment, the electronic control system is configured to terminate operation of the electric turbo motor if any of: the engine speed condition is not satisfied; the turbo speed condition is not satisfied; the AFR condition is not satisfied; and a maximum on time condition for the electric turbo motor is satisfied.

According to another aspect of the present disclosure, a method includes operating a valve train of an internal combustion engine with a Miller cycle; detecting a transient event during operation of the valve train with the Miller cycle; in response to the transient event, initiating operation of an electric turbo motor to boost compression of an intake flow from a first stage of a multi-stage turbocharger system to a second stage of the multi-stage turbocharger system; and further compressing the boosted compressed intake flow from the first stage with the second stage of the multi-stage turbocharger system upstream of the internal combustion engine.

In an embodiment, the method includes initiating operation of the electric turbo motor to boost compression of the intake flow in response to the transient event only if: an engine speed condition is satisfied in response to an engine speed not exceeding an engine speed threshold; a turbo speed condition is satisfied in response to a turbo speed of the first stage not exceeding a turbo speed threshold; an AFR condition does not exceed an AFR threshold or an OFC condition is operating in an oxygen fuel control mode; and a minimum off time condition for the electric turbo motor is satisfied by the electric turbo motor being off or deactivated for at least a predetermined time.

In a refinement of the above embodiment, the method includes terminating operation of the electric turbo motor if any of: the engine speed condition is not satisfied; the turbo speed condition is not satisfied; the AFR condition is not satisfied; and a maximum on time condition for the electric turbo motor is satisfied.

In an embodiment, the method includes engaging the electric turbo motor to a shaft between a compressor and a turbine of the first stage of the multi-stage turbocharger in response to the transient event.

In an embodiment, the method includes inter-cooling the boosted compressed intake flow between the first and second stages of the multi-stage turbocharger system; and after-cooling the further compressed intake flow downstream of the second stage of the multi-stage turbocharger system.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected.

It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An internal combustion engine system, the system comprising:
an internal combustion engine including an intake system and an exhaust system, the internal combustion engine including at least one cylinder for receiving an intake flow for combustion to produce an exhaust flow;
a turbocharger system including a lower pressure turbocharger and a higher pressure turbocharger in series with one another, wherein:
the lower pressure turbocharger includes a first turbine and a first compressor that is driven by the exhaust flow through the first turbine to compress the intake flow;
the higher pressure turbocharger includes a second turbine upstream of the first turbine in the exhaust system, and the higher pressure turbocharger includes a second compressor downstream of the first compressor in the intake system, the second compressor being driven by the exhaust flow through the second turbine to further compress the compressed intake flow from the first compressor; and
an electric turbo motor connected to the first compressor that is operable to drive the first compressor to boost an output of the first turbine; and
a controller configured to operate the electric turbo motor to drive the first compressor to provide a compression boost of the intake flow to the internal combustion engine in response to a transient event for the internal combustion engine.

2. The system according to claim 1, wherein the electric turbo motor is connected to a shaft between the first compressor and the first turbine in response to the transient event in order to drive the first compressor during the transient event.

3. The system according to claim 1, further comprising an intercooler in the intake system between the first compressor and the second compressor.

4. The system of claim 3, further comprising an aftercooler in the intake system downstream of the second compressor.

5. The system according to claim 4, further comprising a wastegate around the second turbine.

6. The system according to claim 1, wherein the internal combustion engine includes a valve train comprising one or more intake valves and one or more exhaust valves for the at least one cylinder.

7. The system according to claim 6, wherein the one or more intake valves are operated in a Miller cycle.

8. The system according to claim 7, wherein the controller is configured to operate the electric turbo motor to drive the first compressor in response to the transient if:
an engine speed condition is satisfied;
a turbo speed condition is satisfied;
at least one of an air-fuel ratio (AFR) condition and an oxygen-fuel-control (OFC) condition is satisfied; and
a minimum off time condition for the electric turbo motor is satisfied.

9. The system of claim 8, wherein one or more of:
the engine speed condition is satisfied if an engine speed does not exceed an engine speed threshold;
the turbo speed condition is satisfied if an estimated turbo speed of the lower pressure turbocharger does not exceed a turbo speed threshold;
the AFR condition is satisfied if an air-fuel-ratio of the internal combustion engine does not exceed an AFR threshold;
the OFC condition is satisfied if the internal combustion engine is operating in an oxygen fuel control mode; and
the minimum off time condition for the electric turbo motor is satisfied if the electric turbo motor has been off or deactivated for at least a predetermined time.

10. The system of claim 8, wherein the electronic control system is configured to terminate operation of the electric turbo motor if any of:
the engine speed condition is not satisfied;
the turbo speed condition is not satisfied;
the AFR condition is not satisfied; and
a maximum on time condition for the electric turbo motor is satisfied.

11. The system of claim 10, wherein the maximum on time condition for the electric turbo motor is satisfied if the electric turbo motor has been on or activated for at least a predetermined time.

12. An apparatus for controlling operation of the internal combustion engine, the internal combustion engine including:
an intake system and an exhaust system;
at least one cylinder for receiving an intake flow from the intake system, for receiving fuel, and to produce an exhaust flow to the exhaust system;
a valve train associated with the at least one cylinder including at least one intake valve for operation in a Miller cycle and at least one exhaust valve;
a multi-stage turbocharger system driven by the exhaust flow, the multi-stage turbocharger system including a first compressor in the intake system that is coupled to an electric turbo motor and that is coupled to a first turbine, the multi-stage turbocharger further including a second compressor downstream of the first compressor and a second turbine upstream of the first turbine that is coupled to the second compressor;
the apparatus comprising a controller operably connected to the internal combustion engine, the controller configured to:
determine a transient event associated with the internal combustion engine; and
initiate operation of the electric turbo motor in response to the transient event to provide a compression boost of the intake flow by the first compressor.

13. The apparatus according to claim 12, wherein the controller is configured to receive inputs from one or more sensors that provide one or more parameters indicative of an engine speed of the internal combustion engine, a turbo speed associated with the first compressor and the first turbine, an air-fuel ratio (AFR) condition, and an oxygen-fuel-control (OFC) condition.

14. The apparatus of claim 13, wherein the controller is configured to operate the electric turbo motor to drive the first compressor in response to the transient if:
an engine speed condition is satisfied in response to the engine speed not exceeding an engine speed threshold;
a turbo speed condition is satisfied in response to the turbo speed not exceeding a turbo speed threshold;
an air-fuel ratio (AFR) condition does not exceed an AFR threshold or an oxygen-fuel-control (OFC) condition is operating in an oxygen fuel control mode; and
a minimum off time condition for the electric turbo motor is satisfied by the electric turbo motor being off or deactivated for at least a predetermined time.

15. The apparatus of claim 14, wherein the electronic control system is configured to terminate operation of the electric turbo motor if any of:
the engine speed condition is not satisfied;
the turbo speed condition is not satisfied;
the AFR condition is not satisfied; and
a maximum on time condition for the electric turbo motor is satisfied.

16. A method, comprising:
operating a valve train of an internal combustion engine with a Miller cycle;
detecting a transient event during operation of the valve train with the Miller cycle;
in response to the transient event, initiating operation of an electric turbo motor to boost compression of an intake flow from a first stage of a multi-stage turbocharger system to a second stage of the multi-stage turbocharger system; and further compressing the boosted compressed intake flow from the first stage with the second stage of the multi-stage turbocharger system upstream of the internal combustion engine.

17. The method according to claim 16, further comprising initiating operation of the electric turbo motor to boost compression of the intake flow in response to the transient event only if:
an engine speed condition is satisfied in response to an engine speed not exceeding an engine speed threshold;
a turbo speed condition is satisfied in response to a turbo speed of the first stage not exceeding a turbo speed threshold;
an air-fuel ratio (AFR) condition does not exceed an AFR threshold or an oxygen-fuel-control (OFC) condition is operating in an oxygen fuel control mode; and
a minimum off time condition for the electric turbo motor is satisfied by the electric turbo motor being off or deactivated for at least a predetermined time.

18. The method of claim 17, further comprising terminating operation of the electric turbo motor if any of:
the engine speed condition is not satisfied;
the turbo speed condition is not satisfied;
the AFR condition is not satisfied; and
a maximum on time condition for the electric turbo motor is satisfied.

19. The method of claim 16, further comprising engaging the electric turbo motor to a shaft between a compressor and a turbine of the first stage of the multi-stage turbocharger in response to the transient event.

20. The method according to claim 16, further comprising:
inter-cooling the boosted compressed intake flow between the first and second stages of the multi-stage turbocharger system; and
after-cooling the further compressed intake flow downstream of the second stage of the multi-stage turbocharger system.

* * * * *